United States Patent [19]

Tsujimoto et al.

[11] Patent Number: 4,950,353
[45] Date of Patent: Aug. 21, 1990

[54] MANUFACTURING APPARATUS FOR SHEET-SHAPED MOLDING MATERIAL INCLUDING A SCATTERING AND SCRAPING ROLLER

[75] Inventors: Yasuhiro Tsujimoto; Masayuki Kurita; Masaru Aoki, all of Shimizu, Japan

[73] Assignee: Takeda Chemical Industries, Ltd., Osaka, Japan

[21] Appl. No.: 291,302

[22] Filed: Dec. 28, 1988

[30] Foreign Application Priority Data

Dec. 28, 1987 [JP] Japan .................................. 333757

[51] Int. Cl.$^5$ .......................... B29C 39/20; B65B 9/02
[52] U.S. Cl. .................... 156/547; 156/62.4; 156/578; 222/423; 239/561; 425/82.1; 425/83.1
[58] Field of Search ...................... 156/62.4, 356, 547, 156/550, 578; 222/403, 423; 53/111 R; 366/183; 118/300, 308, 313, DIG. 16; 425/80.1, 82.1, 83.1; 264/115, 121, 128; 239/561

[56] References Cited

U.S. PATENT DOCUMENTS

| | | | |
|---|---|---|---|
| 2,168,997 | 8/1939 | Lankes et al. | 239/561 |
| 3,932,980 | 1/1976 | Mizutani et al. | 53/111 R |
| 4,332,281 | 6/1982 | Baba | 222/423 |

Primary Examiner—Michael W. Ball
Assistant Examiner—Steven D. Maki
Attorney, Agent, or Firm—Wenderoth, Lind & Ponack

[57] ABSTRACT

An apparatus for continuously manufacturing a sheet of molded compound includes a first conveying unit for continuously conveying a lower film. First and second impregnation rollers are provided above the lower film for impregnating a viscous material and a solid material to obtain a compound mixture to be dropped onto the lower film. First and second scraping rollers are provided below the first and second impregnation rollers to scrape the compound mixture from the impregnation rollers. A scattering roller is provided below the first impregnation roller upstream from the first scraping roller relative the feed direction of the lower film. The scattering roller is positioned to act upon rotation to prevent scattering of portions of the composite mixture caused at least in part by the first scraping roller. A second conveying unit is provided for conveying an upper film. Included in the second conveying unit is a guide roller positioned below the second impregnation unit downstream the second scraping roller relative the feed direction of the lower film. The guide roller is positioned with the upper film disposed thereabout to prevent scattering of portions of the composite mixture caused at least in part by the second scrapping roller. Supply pipes are provided for supplying the viscous material which are disposed above the first and second impregnation rollers. Each supply pipe includes a plurality of openings which have varying opening areas to compensate for a decrease in an internal pressure of the supply pipe as the viscous material flows within the supply pipe.

8 Claims, 5 Drawing Sheets

MANUFACTURING APPARATUS FOR SHEET-SHAPED MOLDING MATERIAL INCLUDING A SCATTERING AND SCRAPING ROLLER

BACKGROUND OF THE INVENTION

The present invention relates to a manufacturing apparatus for a sheet-shaped molding material, and more particularly, to an apparatus for manufacturing a sheet-shaped FRP (fibrous glass reinforced plastic) molding material by conveying between two resin-made films a blended and kneaded composition composed of a solid material such as glass fiber or the like and a liquid material such as resin or the like. The apparatus may be suitably used especially in the manufacturing of thick, wide molding compounds (hereinafter referred to as TMC) through equalization of the sheet material thickness in the widthwise direction.

Conventionally, an apparatus as shown in FIGS. 7 and 8 has been well known for manufacturing this type of sheet-shaped FRP molding material. Throughout the drawings, reference character A denotes glass fiber rovings, reference character B denotes a paste-like liquid material composed of resin components or the like, and reference characters C, C' denote films, such as polyethylene sheets. As a first step, the glass fiber rovings A are cut into chopped strands of a given length by a roving cutter 1. Then, the chopped strands are spread onto the liquid material b, which is fed onto mixing rollers 3, 3' for impregnation, from a pipe 2 which supplies the liquid material B. While passing between the rotating mixing rollers 3, 3' as shown, the liquid material b is impregnated into the chopped strands of the glass fiber A. The blended and kneaded composition which has been thus impregnated is scraped off by the scraping rollers 4, 4', which are placed beneath the mixing rollers 3, 3', so as to drop onto the lower film C disposed over the transport conveyer 5. A fixed amount of the blended and kneaded composition is conveyed between the upper film C' and the lower film C and is shaped by a shaping roller 6 into a sheet shaped product for transport at a later process.

When the blended and kneaded composition is made to fall onto the lower film C disposed over the conveyer 5 by the manufacturing apparatus, it does not fall in an equal amount along the width of the lower film C. That is, more will fall in the central portion, with less on both sides, like the distribution condition as shown with the broken lines in FIG. 6, especially when the vertical drop distance from the scraping rollers 4, 4' to the film C is large. Thus, the product provided is thicker at the central portion relative to the width of the sheet, and comparatively thinner at both side portions, with the result being that the resultant products cannot be made uniform in width and thickness.

According to experiments directed to a solution of the above-described problem, it is found that the blended and kneaded composition can be uniformly dropped along the width of the film C when the drop distance from the scraping rollers 4, 4' to the film C is made shorter, and the film C is arranged immediately under the scraping rollers 4, 4' as shown in FIG. 9. However, in this case, 5 to 10% of the blended and kneaded composition is scattered outside the system due to gaps present among the scraping rollers 4, 4' and the film C, thus resulting in more material loss and a polluted side wall.

Furthermore, in the conventional apparatus, when the liquid material B is fed into the rollers 3, 3' for impregnation, it is fed under pressure into the supply pipe 2 by a fixed pump 9 from a tank 8, as shown in FIG. 8. The liquid material B is then fed over the rollers 3, 3' from holes 2a, each having the same diameter and drilled at a given pitch along the length of the pipe 2. In this case, the pressure is higher within the pipe 2 at the portion of the pipe 2 closest the pump 9, and is lower at the other end of the pipe 2 resulting in unequal supply amounts of the liquid material B. That is, an equal amount of liquid material B is not fed across the entire apparatus in the axial direction. This uneven supply of the liquid material B interferes with the equalization of the thickness of the products to be manufactured.

SUMMARY OF THE INVENTION

Accordingly, the present invention has been developed to substantially eliminate the above discussed drawbacks inherent in the prior art manufacturing apparatus. The essential object of the present invention is to provide a manufacturing apparatus for a sheet-shaped molding material, which is capable of shortening the drop distance from the scraping rollers to the lower film so as to remove the uneven supply of the blended and kneaded composition on the lower film.

Another important object of the present invention is to provide a manufacturing apparatus for a sheet-shaped molding material of the above-described type having a roller for preventing scattering which is arranged in a position to be set according to the relationship between the scraping rollers and the film so as to prevent the blended and kneaded composition from being scattered due to the gaps present among the scraping rollers and the lower film.

A further object of the present invention is to provide a manufacturing apparatus for a sheet-shaped molding material of the above-described type, which is capable of uniformly feeding the liquid material evenly across the entire apparatus in the axial direction of the impregnation rollers through improvement in the holes of the pipe for feeding the liquid material, so that the thickness in the lateral direction of the sheet molding material to be manufactured can be equalized.

In accomplishing these and other objects, according to one preferred embodiment of the present invention, a manufacturing apparatus for a sheet-shaped molding material is provided in which a glass fiber and viscous liquid material composed of a resin component are made to pass between a pair of impregnation rollers oppositely disposed, and a thus obtained blended and kneaded composition of the glass fiber and the liquid material is scraped off by a pair of scraping rollers which are disposed having a clearance under each of the impregnation rollers. The composition is dropped onto a lower film, and, thereafter, is conveyed between the lower film and an upper film. The lower film is disposed almost horizontally from the supply side with a gap being provided immediately under the pair of scraping rollers. A roller for preventing scattering is provided between the scraping roller on the side of the lower film supply. A point where a common tangent crosses the supply line of the lower film is adapted to be located behind the rollers for preventing scattering, with the tangent touching the lower end face of the rollers for preventing scattering and lower end face of the scraping rollers. The diameter of the roller for preventing scattering is set to a diameter such that it comes into contact with or comes close to the lower film and comes close to the impregnation roller on the same side so as to prevent the blended and kneaded composition from being scattered outside of the system by the rollers for preventing scattering.

Also, on the side of another scraping roller of the upper film supply side which confronts the other scraping roller of the lower film supply side, the extending line of the common tangent on the outer side with respect to the impregnation roller on the same side as the scraping roller and the supply line of the upper film covered on the top face of the blended and kneaded composition are set to cross on the side of the impregnation roller, with respect to each other. Therefore, the blended and kneaded composition to be scattered on the side of the roller is adapted to scatter over the upper film so that it may not be projected out of the system.

The scraping roller is disposed close to the under face of the impregnation roller at a gap of 0.05 mm to 2 mm. The scraping rollers are respectively rotated at 1,000 to 10,000 rpm in the same direction as the pair of impregnation rollers so as to cause the blended and kneaded composition to be scraped from the surface of the impregnation rollers. Also, when the thickness of the blended and kneaded composition to be placed on the lower film has been set to 20 mm, the gap between the scraping roller on the supply side of the lower film and the lower film becomes approximately 20 mm corresponding to the thickness of the blended and kneaded composition. The gap between the scattering roller to be disposed on the other side of the scraping rollers and the lower film completely prevents the scattering of the blended and kneaded composition, wherein the common tangent between the scattering roller and the scraping roller crosses the supply side of the lower film, and the gap between the scattering roller and the impregnation roller is made smaller, so that the load may not be applied abnormally on the rotation of the impregnation roller by the blended and kneaded composition attached on both the rollers so as to prevent the blended and kneaded composition from being scattered. Furthermore, the gap between the scraping roller of the upper film supply side of the upper film and the lower film is 40 mm, while the gap between the blended and kneaded composition and the scraping roller is 20 mm, with the gap between the upper film guide roller for making the upper film confront the top face of the lower film and the lower film being set to 30 mm, while the gap between the blended and kneaded composition and the upper film is 10 mm.

Also, in the present invention, in order to equally feed the liquid material along the axial direction of the entire impregnation roller, the opening area for feeding the liquid material drilled in the supply pipe is made smaller on the upper stream side having a higher pressure, and is made larger on the lower stream side having a lower pressure, in terms of the pressure within the pipe.

The opening of the above-described liquid material is required to be made 0.7 mm or more in diameter to prevent the foreign materials from being bitten. It is found from experimental results that the interval of the opening is desired to be 10 mm or less. When, for example, the length of the supply pipe is 1,000 mm, and the axial length of the impregnation roller is 1,000 mm, the holes 1.9 $\phi$, 2.0 $\phi$, 2.1 $\phi$ are drilled to a pitch of 3.5 mm, so that the holes, each being different in the diameter, are combined so as to make the opening area per length larger as the pressure becomes lower.

In the liquid material to be used in the present invention, the thickening agent made of MgO paste (magnesia paste) and various types of coloring agents made of liquid are mixed with a compound liquid, wherein unsaturated polyester resin, liquid resin such as styrene solution of polystyrene or the like, styrene monomer of liquid, filler agent of the calcium carbonate of particles, aluminum trihydroxide or the like, inner mold releasing agent such as zinc stearate of particles, calcium stearate or the like, catalyst made of BPO (benzoyl peroxide) of liquid or paste, TBPB (t-bytyl perbenzoate) or the like and stabilizer such as HQ (hydroquinone) made of particles PBQ (parabenzoquinone) or the like are composed.

The glass fibers which are used as a reinforcing material for a solid material for mixing, with the liquid material, on the impregnation roller are glass rovings of 12$\mu$, TEX 4630 cut into given length of 1" or so.

Polyethylene film, polypropylene film are used as sheets to cover both the upper and lower faces of the blended and kneaded composition.

The sheet-like molding material to be molded of the blended and kneaded composition being covered with the film is 5 to 10 mm or so in thickness, with the TMC of 0.55 to 1 mm or so in width being an object. The sheet-like molding material is molded into products for various applications by a molding method of compression or the like. For example, housing facilities such as a bathtub, waterproof pan, water tank panel, balcony and so one, motor car appliances such as an air spoiler, air intake, roof, side panel, engine hood, and so on, chair, tray, parabola antenna and so on may be suitably manufactured.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
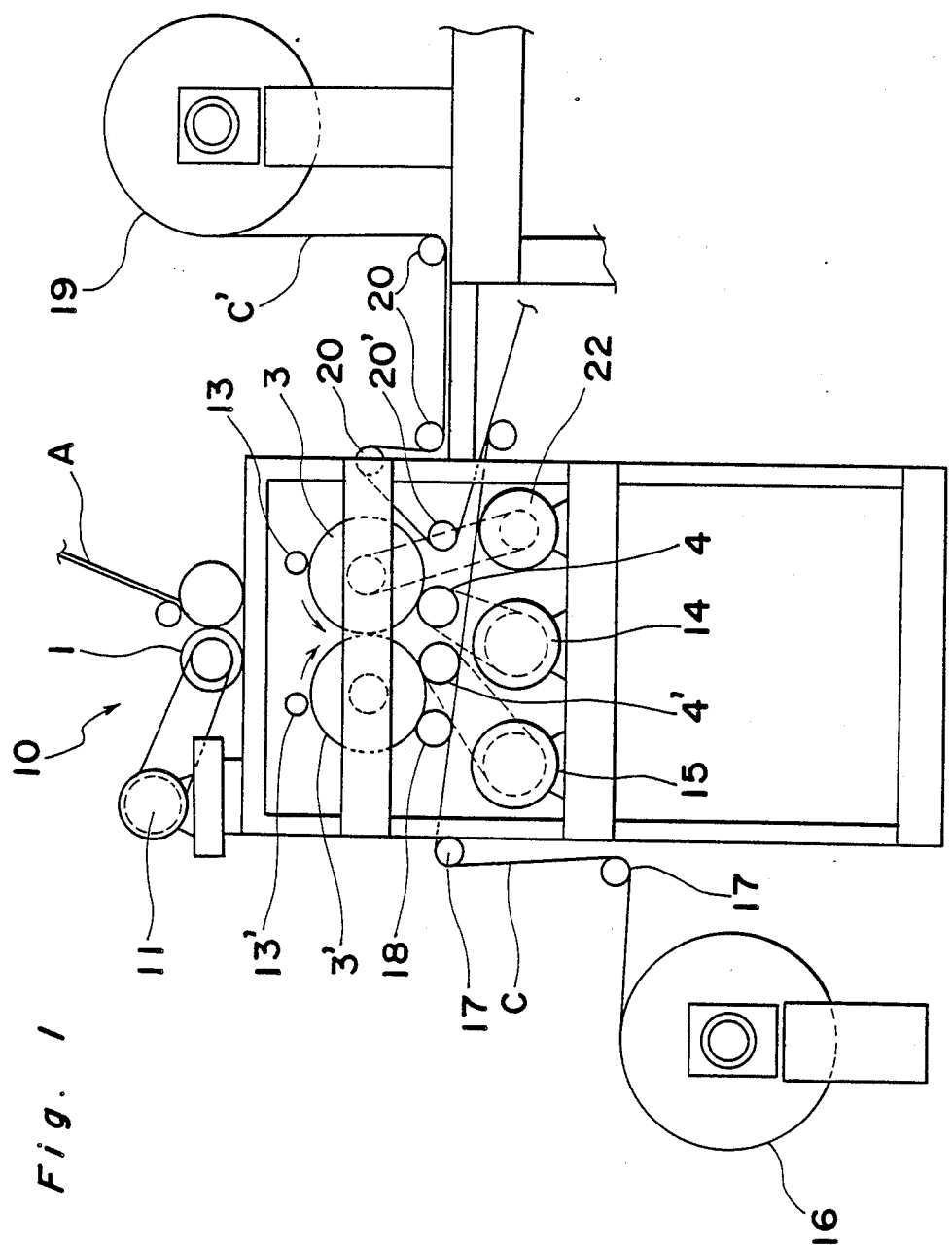
FIG. 1 is a side elevational view showing an embodiment of an apparatus in accordance with the present invention.

Before the description of the present invention proceeds, it is noted that like parts are designated by like reference numerals throughout the accompanying drawings.

Referring now to the drawings, there is shown an apparatus adapted in the embodiment of FIG. 1. In FIG. 1, a roving cutter 1 is rotatively mounted on the top end of a frame 10 of the impregnating apparatus. The roving cutter 1 is rotated by a motor 11 to cut the glass roving A, which is guided between the roving cutter 1 and an opposite roller 12 provided facing the roving cutter 1, into a given length so as to drop the cut glass fibers onto impregnation rollers 3, 3'. The impregnation rollers 3, 3' are rotated inwardly with respect to each other as shown by a motor 22. The impregnation rollers 3, 3', each being approximately 100 to 1,000 mm in diameter, are preferred to have a mutual gap of approximately 2 to 10 mm and a rotational speed of approximately 10 to 200 rpm. A pair of supply pipes 13, 13' for supplying the liquid material are described later and are disposed so as to scatter the liquid material B onto the surfaces of the impregnation rollers 3, 3'. Thus, the glass fibers are impregnated in the liquid material B through the gap provided between the impregnation rollers 3, 3', and the blended and kneaded composition which has thus been impregnated moves downwardly along the surfaces of the impregnation rollers 3, 3'.

A pair of scraping rollers 4, 4' are disposed respectively at the under portions of the impregnation rollers 3, 3'. These rollers 4, 4' are rotated by motor 14, 15 at a high speed in the same directions as the corresponding impregnation rollers 3, 3' as shown by the arrows in FIG. 2. The scraping rollers 4, 4' are smaller in diameter than the impregnation rollers 3, 3' and are approximately 50 to 200 mm in diameter. The rotational speed of the scraping rollers 4, 4' is considerable larger than that of the impregnation 3, 3', with the speed being approximately 1,000 to 10,000 rpm as a rule. The gap between the impregnation roller 3 and the scraping roller 4' is normally about 0.05 to 2 mm. The blended and kneaded composition being conveyed along the surfaces of the impregnation rollers 3, 3' is scraped off by the scrapping rollers 4, 4', so that the blended and kneaded composition drops onto the lower film C to be downwardly fed.

Figure 2:
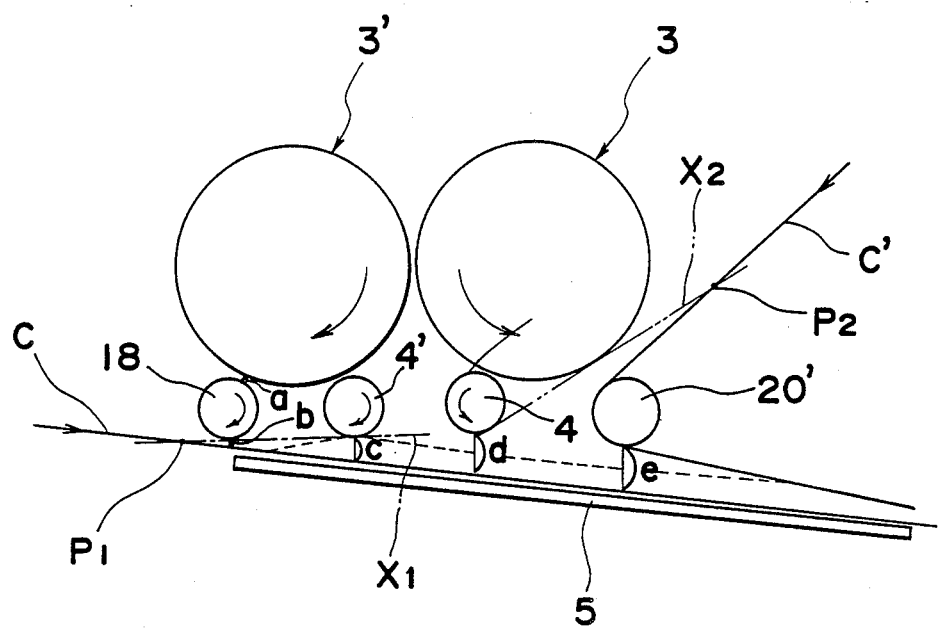
FIG. 2 is an enlarged view of essential portions of FIG. 1.

The lower film C is fed immediately under the scrapping rollers 4,4', as shown in FIG. 2, through a guide roller 17 from a lower film unwinding machine 16, for example, with the downstream side being inclined downwardly at a slight angle with respect to an approximately horizontal line. A scattering roller 18 for preventing the blended and kneaded composition from being scattered is disposed, on the supply side of the lower film C, on the outer side of the roller 4' and in a position between the top face of the lower film C and the lower face of the impregnation roller 3'. The position of the scattering roller 18 is set so that the common tangent $X_l$ of the lower end faces between the scattering roller 18 and the scraping roller 4 crosses at a rear point $P_l$ with the supply line of the lower film C. Thus, the scattering roller 18 and the lower film C are close to or in contact with each other within a range such that a load is not applied upon their mutual operation. Also, the gap between the scattering roller 18 and the impregnation roller 3' is brought into close contact within a range such that a load is not applied upon their mutual rotation.

On the other hand, the other upper film C' is guided through guide roller 20 from an upper film unwinding machine 19 and is fed over the lower film C by the last guide roller 20' disposed downwardly from the impregnation roller 3 and externally of the scraping roller 4. The supply line of the upper film C' is fed onto the final guide roller 20', and a common tangent $X_2$ on the external side between the scraping roller 4 and the impregnation roller 3 is adapted to cross at an intersecting point $P_2$ on the side of the impregnation roller 3. The blended and kneaded composition scattered from the gap between the scraping roller 4 on the side of the upper film supply and the lower film C adheres to the upper film C' to prevent the blended and kneaded composition from being scattered out of the system.

The distance between the lower film C and each of the rollers 3, 3', 18, 4, 4', 20', with the thickness of the blended and kneaded composition being 20 mm, is set in the present embodiment in such a manner that the gap (a) between the scattering roller 18 and the impregnation roller 3' is 8 mm, the gap (b) between the scattering roller 18 and the lower film C is 3 mm, the gap (c) between the scrapping roller 4' and the lower film C is 20 mm, the gap (d) between the scrapping roller 4 and the lower C is 40 mm, and the gap (e) between the guide roller 20' and the lower film C is 30 mm.

Figure 3:
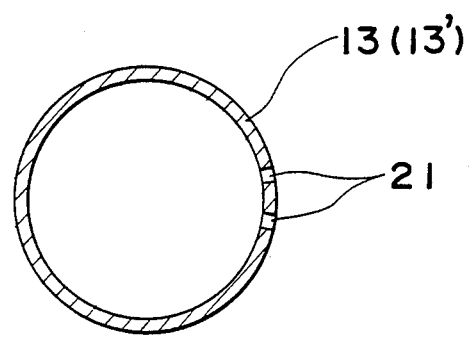
FIG. 3 is a cross-sectional view of a pipe for feeding liquid material.
Figure 4:
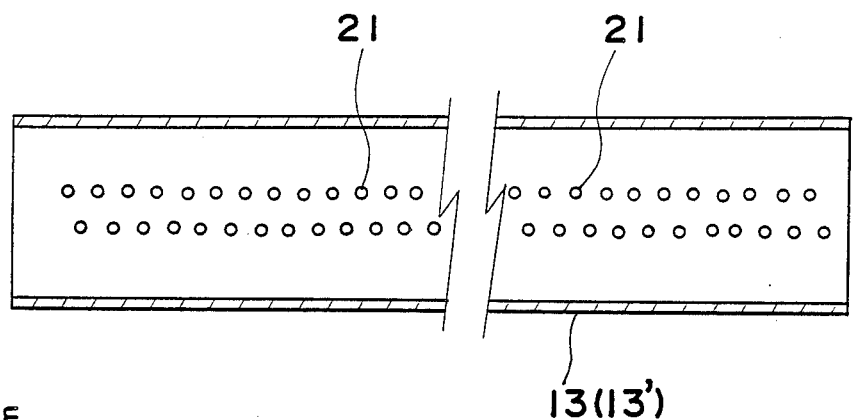
FIG. 4 is a side view of a pipe shown in FIG. 3.
Figure 5:
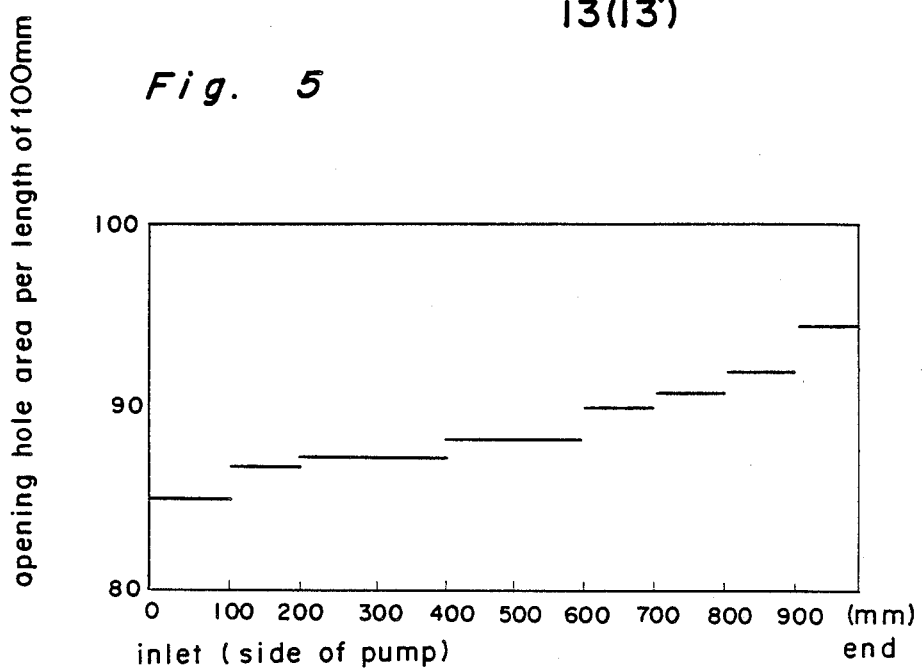
FIG. 5 is a chart showing the opening area per length of the pipe.

On the other hand, the supply pipes 13, 13', which scatter the liquid material B onto the impregnation rollers 3, 3', have openings 21 arranged in two rows in the axial direction, and composed of round holes drilled at a constant pitch on the lower side facing the impregnation rollers 3, 3' as shown in FIGS. 3 and 4. There are three sets of openings which are different in diameter, for instance, 1.9 $\phi$, 2.0 $\phi$, 2.1 $\phi$. These openings 21 are combined and are set having sequentially large diameters as shown in FIG. 5 along the length of the supply pipes 13, 13' from the upper stream side on the side of the feed pump (no shown) to the lower stream side of the supply pipe end. In the manner as described hereinabove, an almost equal amount of liquid material B is adapted to be spread across the entire apparatus in the axial direction of the impregnation rollers 3, 3', with the opening area of the openings 21 being made small on the upper stream side having the higher internal pressure, and the opening area being made larger on the lower stream side having the lower pressure.

Figure 6:
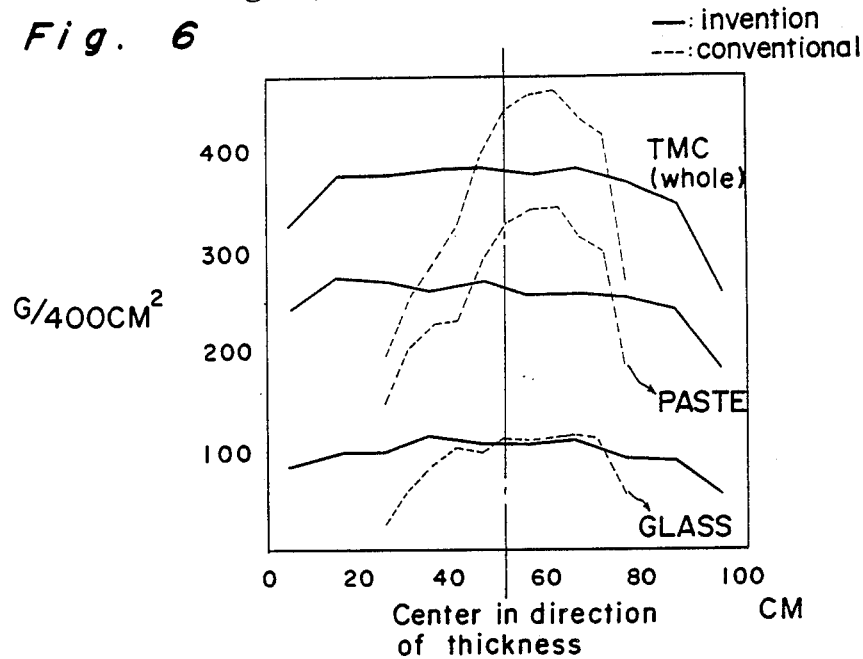
FIG. 6 is a chart showing the comparison between the distribution condition in the lateral direction of the apparatus of the present invention and the distribution condition of the conventional apparatus.
Figure 9:
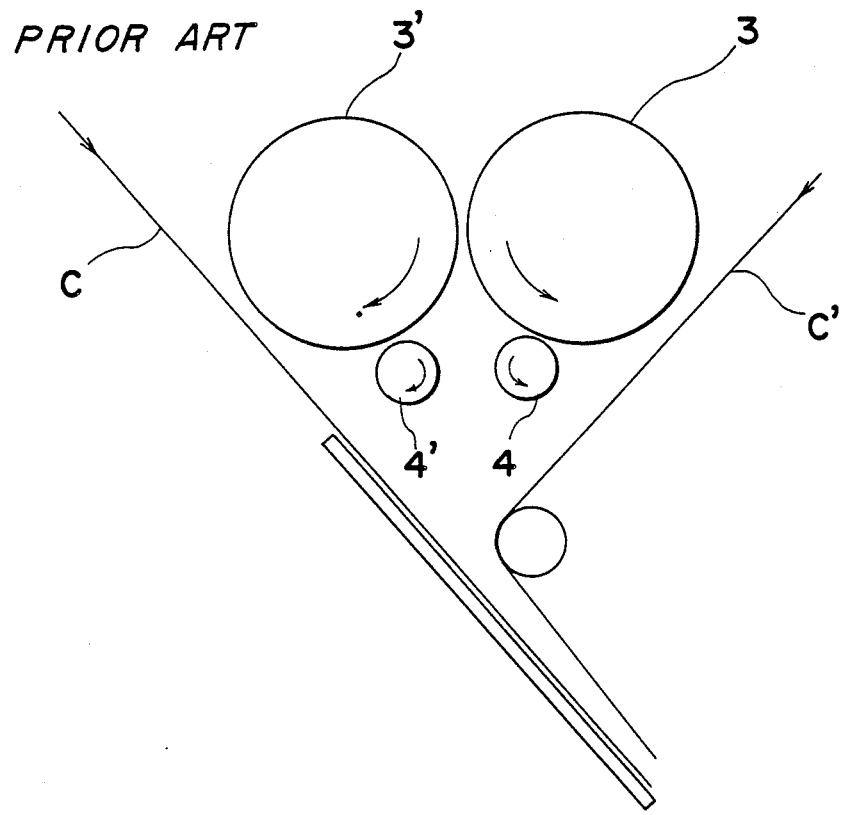
FIG. 9 is a schematic view showing a conventional apparatus wherein the lower film has been disposed immediately under the roller.
Figure 7:
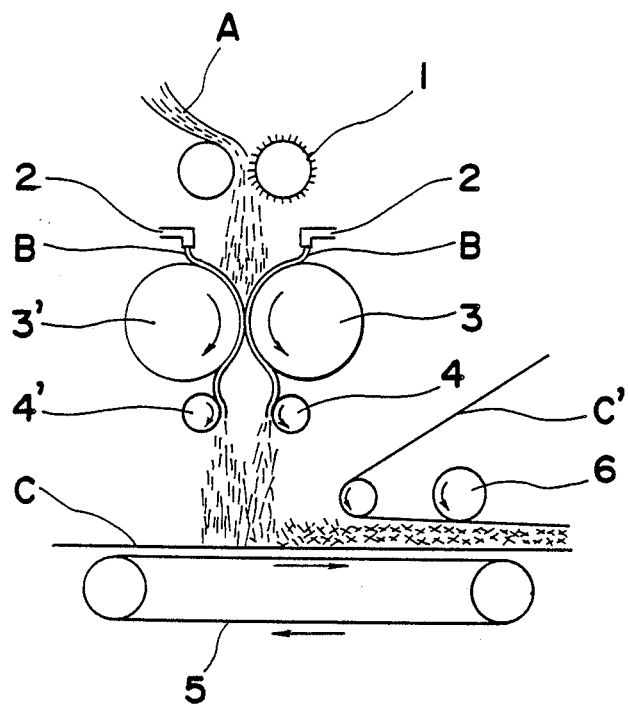
FIG. 7 is a schematic view showing the conventional embodiment.
Figure 8:
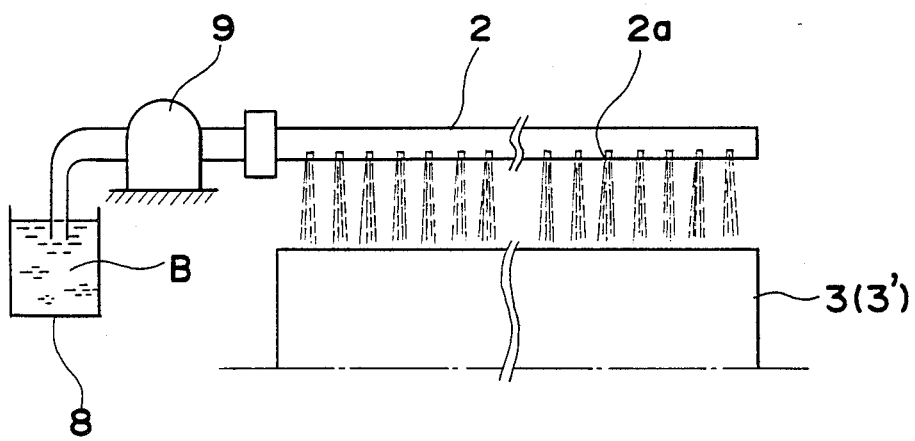
FIG. 8 is a schematic view showing the conventional pipe for feeding the liquid material.

According to the impregnation of the above construction, as the lower film C is disposed immediately under the scrapping rollers 4, 4', and the liquid material B is equally scattered in the axial direction onto the surface of the impregnation rollers 3, 3', the glass fiber, the liquid material, and the blended and kneaded composition thereof may be fed approximately equally across in the entire width of the lower film C in the lateral direction. According to experimental results, the distribution condition in the lateral direction by the present apparatus is shown by the solid lines of FIG. 6, which clearly shows a more desirable distribution as compared with the distribution condition shown With broken lines by the conventional apparatus.

Furthermore, when the lower film C is disposed immediately under the scraping rollers 4, 4', a portion of the blended and kneaded composition is projected due to the gap between the scrapping roller 4' and the lower film C. However, the scattering roller 18 is disposed on a common tangent with the scraping roller 4' and above the lower film C to prevent this type of scattering.

The present invention is not restricted to the above-described embodiment. For example, the openings to be drilled in the supply pies 13, 13' of the liquid material B are not restricted to round holes, but may be drilled having differing pitches. An equal amount of liquid material B is required to be scattered in the axial direction of the pipe by variations in the opening areas in accordance with the varying pipe pressure.

As is clear from the foregoing description, according to the apparatus of the present invention, the blended and kneaded composition may be equally distributed across the entire width of the lower film C by arrangement of the lower film C immediately under the scraping rollers 4, 4". The scattering of the blended and kneaded composition, which is caused where the lower film C is placed immediately under the scraping rollers 4, 4', may be positively prevented by the arrangement of the scattering roller 18, thereby reducing raw material loss of the blended and kneaded composition to reduce costs and to prevent resultant pollution. The scattering of the liquid material B onto the impregnation rollers 3, 3' is almost equally effected in the axial direction, and an equal distribution of the blended and kneaded composition may be further improved as a result. As the blended and kneaded may distributed equally in the lateral direction in such a manner as described hereinabove, the sheet-shaped material to be manufactured is to have an equal thickness in the lateral direction. Particularly, as it was conventionally difficult to easily manufacture the equal TMC having an equal thickness, the present apparatus has a significant effect in that an equally thick TMC may be manufactured.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed:

1. An apparatus for continuously manufacturing a sheet of a molded compound, said apparatus comprising:
   first means for continuously conveying a lower film in a feed direction, the lower film extending widthwise in a direction lateral to said feed direction;
   first and second impregnation rollers disposed above the lower film, said first and second impregnation rollers extending parallel to each other to define a mixing gap therebetween in a direction lateral to said feed direction, said first impregnation roller being positioned further upstream relative said feed direction than said second impregnation roller;
   means for rotating said first and second impregnation rollers in opposite rotational directions at a first rotational speed;
   first supply means disposed above said first and second impregnation rollers for supplying a viscous material and for depositing said viscous material along a surface of said first and second impregnation rollers to form a viscous layer on said first and second impregnation rollers;
   second supply means disposed above said first and second impregnation rollers for supplying a solid material and for depositing said solid material onto said viscous layer to be conveyed into said mixing gap during rotation of said first and second impregnation rollers to form a composite mixture, whereby said composite mixture is deposited on said lower film;
   first and second scraping rollers respectively disposed below said first and second impregnation rollers and above the lower film, said first scraping roller extending parallel to said first impregnation roller to define a first gap therebetween said second scraping roller extending parallel to said second impregnation roller to define second gap therebetween;
   means for rotating said first and second scraping rollers in a rotational direction respectively the same as said first and second impregnation rollers and at a second rotational speed greater than said first rotational speed;
   said first and second scraping rollers respectively positioned to act upon rotation to remove said composite mixture from said first and second impregnation rollers;
   a scattering roller disposed below said first impregnation roller and above the lower film and upstream said first scraping roller relative said feed direction, said scattering roller extending parallel said first impregnation roller to define a third gap therebetween;
   means for rotating said scattering roller in a same direction as said first impregnation roller;
   said scattering roller positioned to act upon rotation to prevent scattering of portions of said composite mixture caused at least in part by said first scraping roller;
   second means for continuously conveying an upper film such that the upper film is conveyed over and along a portion of the lower film continuously conveyed by said first means;
   said second means including guide roller for guiding the upper film, said guide roller being disposed below and extending parallel said second impregnation roller downstream said second scraping roller relative said feed direction, the upper film being guided around said guide roller in a same direction as the rotational direction of said second impregnation roller;
   said guide roller positioned with said upper film disposed thereabout to prevent scattering of portions of said composite mixture caused at least in part by said second scraping roller;
   wherein said scattering roller is positioned substantially closer to said first impregnation roller than to said first scraping roller, and said guide roller is positioned substantially closer to said second impregnation roller than to said second scraping roller.

2. An apparatus as recited in claim 1, wherein a line defined by a common tangent extending along lower portions of said scattering roller and said first scraping roller intersects the lower film at a location upstream said scattering roller relative to said feed direction.

3. An apparatus as recited in claim 1, wherein said scattering roller and said first scraping roller are each positioned closer to the lower film than to each other.

4. An apparatus as recited in claim 1, wherein a line defined by a common tangent of said second scraping roller and said second impregnation roller extends above said guide roller.

5. An apparatus as recited in claim 1, wherein a distance extending from said scattering roller to the lower film is about 3 mm, and a distance extending from said first scraping roller to the lower film is about 20 mm, and a distance extending from said second scraping roller to the lower film is about 40 mm, and a distance extending from said guide roller to the lower film is about 30 mm.

6. An apparatus as recited in claim 1, wherein said mixing gap is between 2 and 10 mm, and said first gap and said second gap are between 0.05 and 2 mm, and said third gap is about 8 mm.

7. An apparatus as recited in claim 5, wherein said mixing gap is between 2 and 10 mm, and said first gap and said second gap are between 0.05 and 2 mm, and said third gap is about 8 mm.

8. An apparatus as recited in claim 1, wherein said first supply means includes:

first and second supply pipes each having first and respectively second ends and extending above and substantially parallel to said first and second impregnation rollers for supplying the viscous material, the viscous material flowing from said first end to said second end within said supply pipe to define a flow direction;

each of said first and second supply pipes including a first plurality of openings extending in a row from said first end to said second end, and a second plurality of openings extending in a row from said first end to said second end;

wherein an opening area of the openings closest to said second end is larger than an opening area of the openings closest to said first end to compensate for a decrease in an internal pressure of said first and second supply pipes as the viscous material flows in the flow direction.

* * * * *